(12) United States Patent
Liu et al.

(10) Patent No.: US 11,782,481 B2
(45) Date of Patent: Oct. 10, 2023

(54) HEAD-MOUNTED DEVICE

(71) Applicant: MERRY ELECTRONICS (SUZHOU) CO., LTD., Suzhou (CN)

(72) Inventors: XiaoLong Liu, Suzhou (CN); ChaoYong Yang, Suzhou (CN); GuangHong Yu, Suzhou (CN)

(73) Assignee: MERRY ELECTRONICS (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 17/861,415

(22) Filed: Jul. 11, 2022

(65) Prior Publication Data

US 2023/0129894 A1 Apr. 27, 2023

(30) Foreign Application Priority Data

Oct. 25, 2021 (CN) .......................... 202122572517.6

(51) Int. Cl.
*G06F 1/16* (2006.01)

(52) U.S. Cl.
CPC ............ *G06F 1/163* (2013.01); *G06F 1/1679* (2013.01)

(58) Field of Classification Search
CPC .................................. G06F 1/163; H04R 1/08
See application file for complete search history.

(56) References Cited

U.S. PATENT DOCUMENTS

| | | | | |
|---|---|---|---|---|
| 5,369,857 A | * | 12/1994 | Sacherman | H04R 5/0335 379/430 |
| 9,344,612 B2 | * | 5/2016 | Ritchey | G02B 27/0179 |
| 10,209,738 B1 | * | 2/2019 | Tompkins | G06F 1/163 |
| 2017/0041695 A1 | * | 2/2017 | Hernandez Vazquez | H04R 1/105 |
| 2021/0080996 A1 | | 3/2021 | Hudman et al. | |

FOREIGN PATENT DOCUMENTS

| | | | |
|---|---|---|---|
| CN | 106353888 A | | 1/2017 |
| CN | 111201471 A | | 5/2020 |
| CN | 113917708 A | * | 1/2022 |
| WO | WO2021/055394 A1 | | 3/2021 |

* cited by examiner

*Primary Examiner* — James Wu
(74) *Attorney, Agent, or Firm* — Birch, Stewart, Kolasch & Birch, LLP

(57) ABSTRACT

The present disclosure provides a head-mounted device including a display component, a speaker component, and a connecting component. Two ends of the connecting component respectively are connected to the display component and the speaker component. The connecting component includes a body, a rotating bracket, and a locking block. The body is connected to the display component and has an opening. The rotating bracket is disposed in the body. One end of the rotating bracket has a first protrusion portion, a second protrusion portion, and an accommodating groove. The other end of the rotating bracket passes through the opening and is connected to the speaker component. The locking block is disposed in the body and is movable to close to or away from the accommodating groove. When the locking block is engaged with the accommodating groove, the rotating bracket is limited to rotate.

8 Claims, 12 Drawing Sheets

HEAD-MOUNTED DEVICE

CROSS REFERENCE TO RELATED DISCLOSURE

This application claims the priority benefit of China Patent Application Number CN202122572517.6, filed on Oct. 25, 2021, the full disclosure of which is incorporated herein by reference.

BACKGROUND

Technical Field

The present disclosure is related to a head-mounted device, and in particular, a head-mounted device that may be adjusted the distance between the speaker and the user.

Related Art

With the development of technology, various electronic wearable devices with close-range have become key products in the market. Taking a virtual reality device of head-mounted devices as an example, the device usually includes a display component and a speaker component. Wherein the display component converts a digital signal into a 3D image and shows the image to the user's eyes, and the speaker component converts a digital signal into a sound information and transfers the sound information to the user's ears, so that the user is immersed in an environment composed of digital signals. Furthermore, when the device further includes a sensor used for simulation, the user may interact with the environment in virtual reality, thereby achieving a deeper immersive experience.

However, the distance between the speaker component of the existing virtual reality device and the user is not easy to adjust. More specifically, the speaker component is generally pressed against the user's head in order to allow the user to wear it stably. In the case of long-term wear, the user may easily feel that the blood is not circulating and even feel pain. As a result, the user's experience of using the virtual reality device is poor. Therefore, the problems mentioned above have become an urgent issue to be solved in the art.

SUMMARY

The embodiments of the present disclosure disclose a head-mounted device, in order to solve the problem that the head-mounted device in the prior art may cause discomfort to a user by wearing it for a long time.

In order to solve the above technical problems, the present disclosure is implemented as follows.

A head-mounted device is provided, which includes a display component, a speaker component, and a connecting component. Two ends of the connecting component are respectively connected to the display component and the speaker component. The connecting component includes a body, a rotating bracket, and a locking block. The body is connected to the display component and has an opening. The rotating bracket is disposed in the body. One end of the rotating bracket has a first protrusion portion and a second protrusion portion having an accommodating groove therebetween. The other end of the rotating bracket passes through the opening and is connected to the speaker component. The locking block is disposed in the body and is movable to close to or away from the accommodating groove. When the locking block is engaged with the accommodating groove, the rotating bracket is limited to rotate In some embodiments, the connecting component further includes a first elastic member. One end of the first elastic member abuts on the locking block, and the other end of the first elastic member abuts on the body.

In some embodiments, a surface of the locking block has an engaging groove. The connecting component further includes a locking pin. One end of the locking pin is disposed on the body, and the other end of the locking pin is in the engaging groove.

In some embodiments, the locking block further has an engaging protrusion. The engaging protrusion is in the engaging groove. When the locking pin is engaged with the engaging protrusion, the locking block is limited from moving towards the accommodating groove.

In some embodiments, the engaging groove has an engaging channel. When the locking block approaches and/or moves away from the accommodating groove, the other end of the locking pin moves along the engaging channel.

In some embodiments, the connecting component further includes a rotating pin and a second elastic member, and the rotating pin passes through the rotating bracket and the second elastic member.

In some embodiments, the locking block has a locking body and a locking protrusion. The locking protrusion protrudes from the locking body. The locking protrusion has an upper surface, a lower surface, and a side surface between the upper surface and the lower surface. The upper surface and the lower surface are plane surfaces, and the side surface is an arc surface.

In some embodiments, the first protrusion and the second protrusion of the rotating bracket have an angle therebetween, and the angle corresponds to the size of the locking protrusion.

In some embodiments, the body includes a first base and a first cover. The first base is disposed on the display component, and the first base has an accommodation space. The first cover is disposed in the accommodation space, and one side of the first cover is connected to the locking block.

In some embodiments, the body further includes a second base disposed in the accommodation space and a second cover disposed on the second base. The first cover is disposed on one side of the second base. The second cover, the first cover, and the second base cover the locking block and part of the rotating bracket.

The head-mounted device of the present disclosure may make the speaker component connected to the rotating bracket have two fixed states through the cooperation between the locking block component and the rotating bracket in the connecting. Specifically, one of the states is that the speaker component is pressed against the user's head, and the other state is that the speaker component is not in contact with the user's head. As a result, the user may adjust the speaker component according to the needs, thereby avoiding the problem of discomfort caused by wearing it for a long time.

BRIEF DESCRIPTION OF THE DRAWINGS

The figures described herein are used to provide a further understanding of the present disclosure and constitute a part of the present disclosure. The exemplary embodiments and descriptions of the present disclosure are used to illustrate the present disclosure and do not limit the present disclosure, in which.

DETAILED DESCRIPTION OF THE EMBODIMENTS

In order to make the objectives, technical solutions, and advantages of the present disclosure clearer, the technical solutions of the present disclosure will be described clearly and completely in conjunction with specific embodiments and the figures of the present disclosure. Obviously, the described embodiments are only a part of the embodiments of the present disclosure, rather than all the embodiments. Based on the embodiments in the present disclosure, all other embodiments obtained by a person of ordinary skill in the art without creative work fall within the protection scope of this disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

Figure 1:
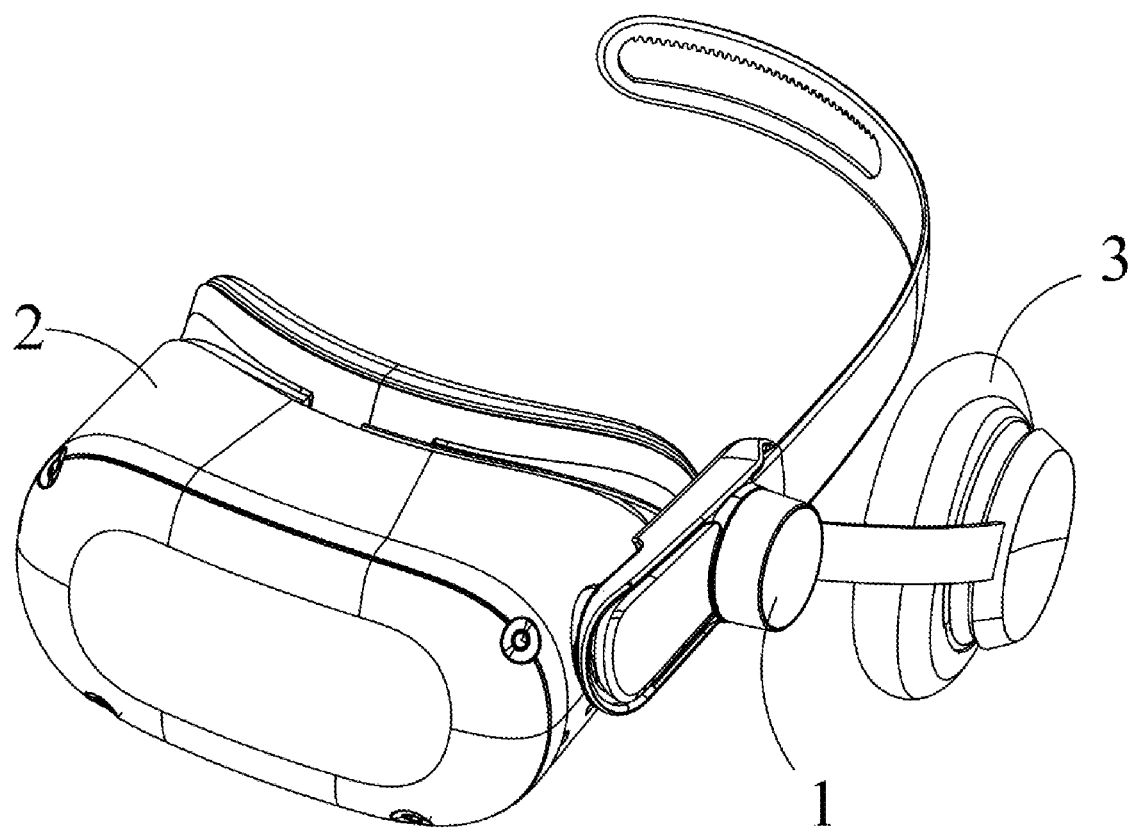
FIG. 1 is a schematic diagram of the head-mounted device according to an embodiment of the present disclosure.
Figure 2:
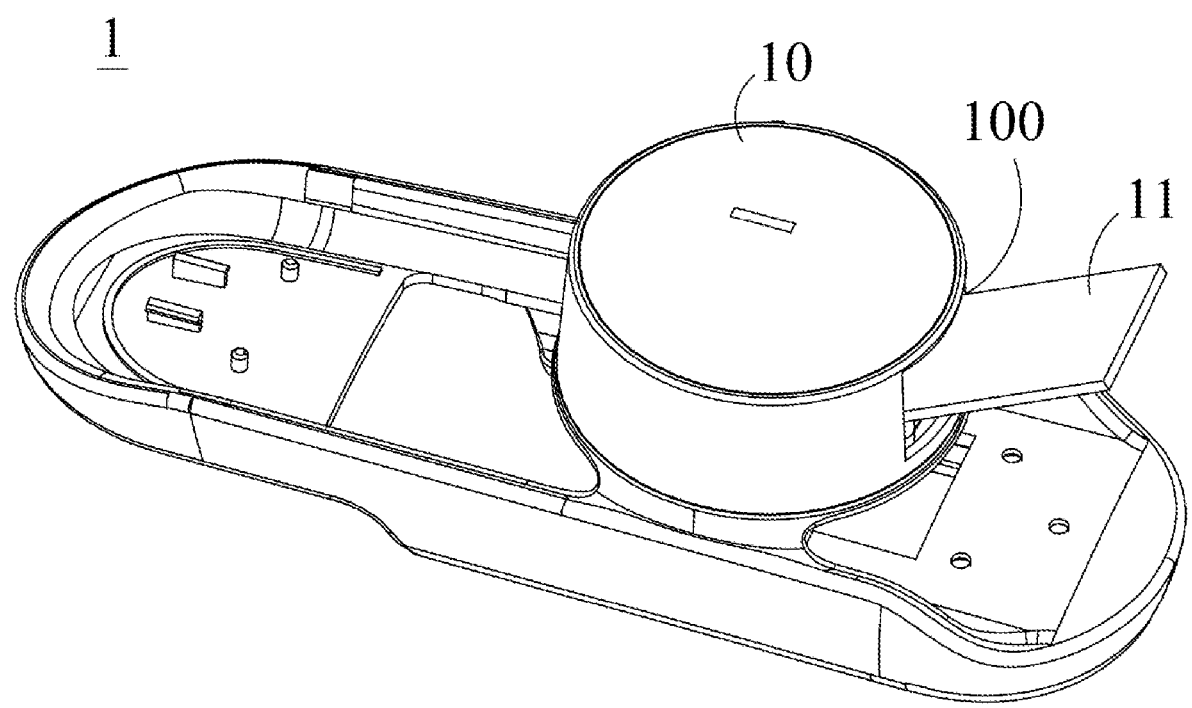
FIG. 2 is a schematic diagram of the connecting component according to an embodiment of the present disclosure.
Figure 3:
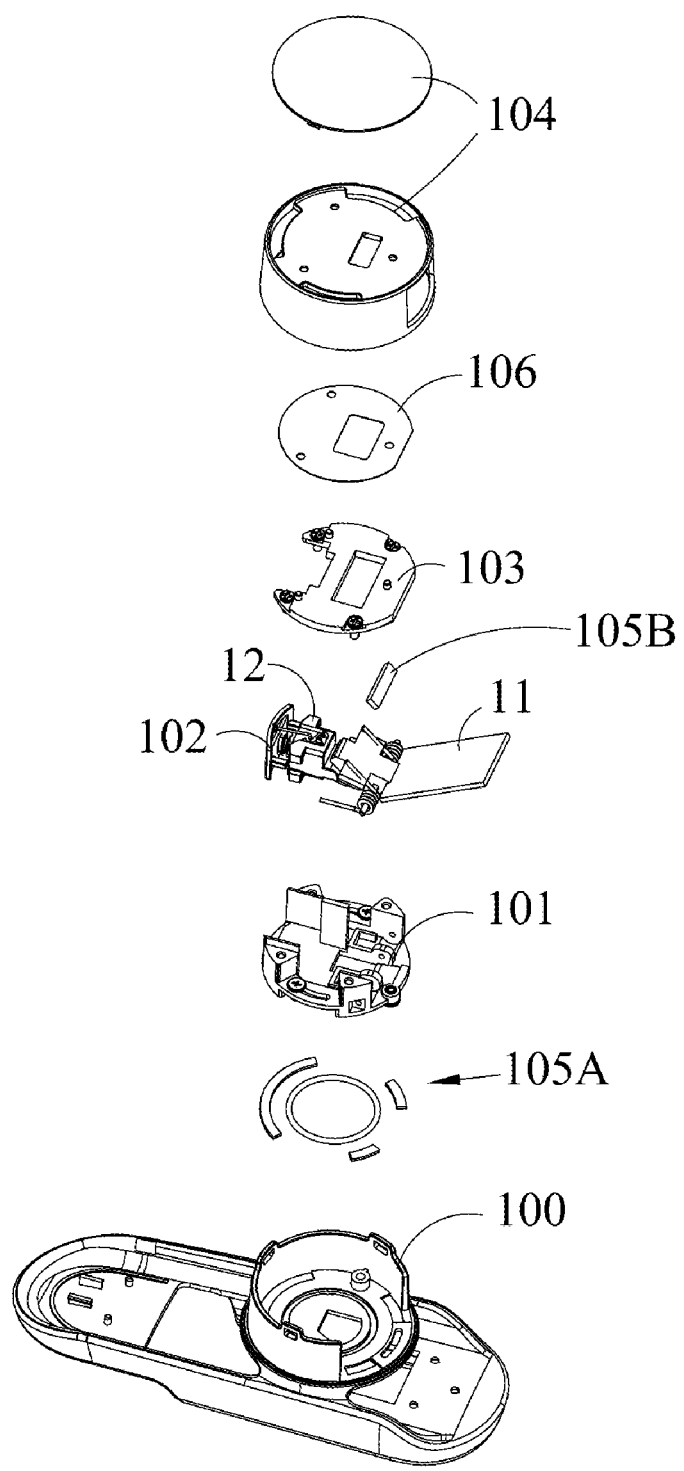
FIG. 3 is an exploded view of the connecting component according to an embodiment of the present disclosure.
Figure 4:
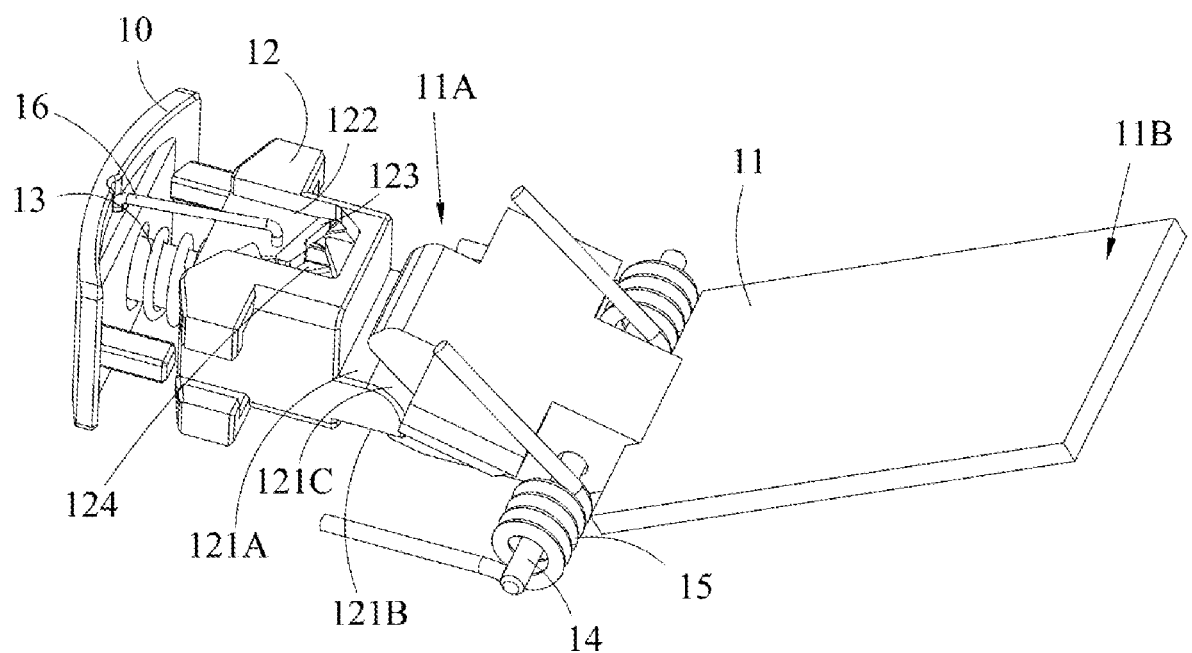
FIG. 4 is a schematic diagram of the rotating bracket and the locking block according to an embodiment of the present disclosure.
Figure 5:
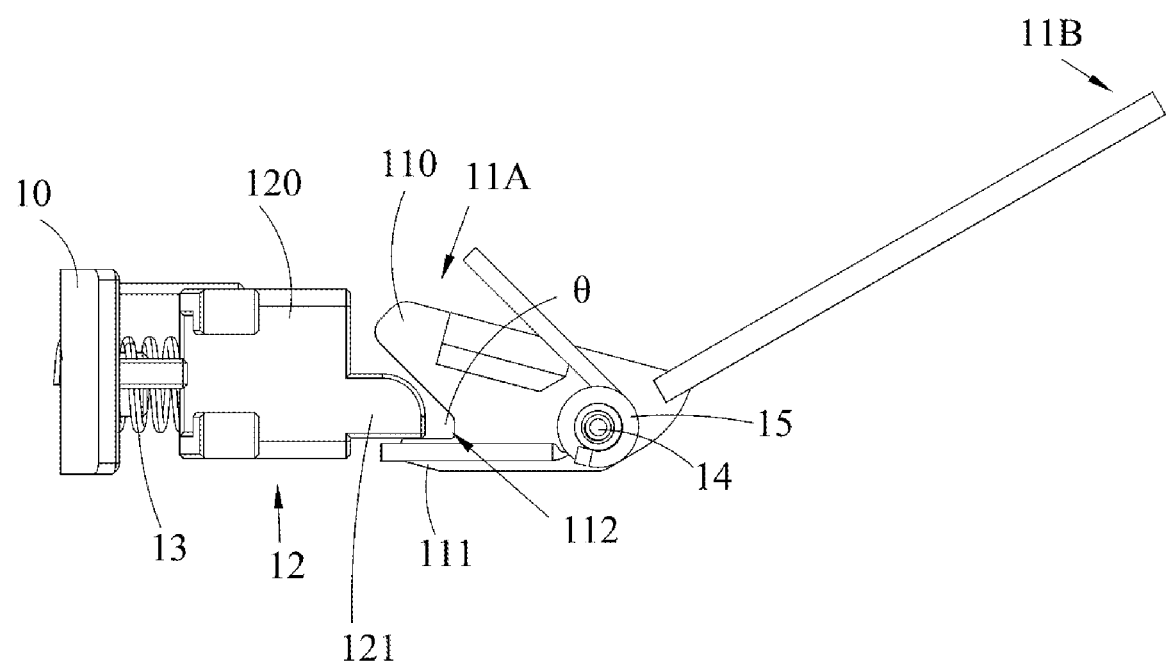
FIG. 5, FIG. 7, FIG. 9, and FIG. 11 respectively are schematic diagrams of an operation of the rotating bracket and the locking block according to an embodiment of the present disclosure.

FIG. 1 is a schematic diagram of the head-mounted device according to an embodiment of the present disclosure, FIG. 2 and FIG. 3 respectively are a schematic diagram and an exploded view of the connecting component according to an embodiment of the present disclosure, FIG. 4 is a schematic diagram of the rotating bracket and the locking block according to an embodiment of the present disclosure, and FIG. 5 is a side view of the rotating bracket and the locking block according to an embodiment of the present disclosure. As shown in the figures, the head-mounted device includes connecting component 1, display component 2, and speaker component 3. Specifically, the head-mounted device of the present disclosure may be a virtual reality device, but the present is not limited thereto. In some embodiments, the head-mounted device may also be an augmented reality device. In other embodiments, the head-mounted device may further include an odor component for converting digital signals into odor molecules, a mist component for converting digital signals into smoke, or other various components for stimulating the user's senses.

As shown in FIG. 1, two ends of the connecting component 1 respectively are connected to the display component 2 and the speaker component 3. More specifically, when the user wears the display component 2, the connecting component 1 may fix the speaker component 3 on (or near) the user's ear. As shown in FIG. 2 to FIG. 4, the connecting component 1 includes a body 10, a rotating bracket 11, and a locking block 12. The body 10 is connected to the display component 2, and the body 10 has an opening 100. Specifically, the opening 100 is disposed on the side surface of the body 10, and the size of the opening 100 may be designed according to the rotation range of the rotating bracket 11. For example, the lateral width of the opening 100 is related to the movement of the rotating bracket 11 in the lateral direction, and the longitudinal width of the opening 100 is related to the movement of the rotating bracket 11 in the longitudinal direction. As shown in FIG. 5, the rotating bracket 11 is disposed in the body 10. One end 11A of the rotating bracket 11 has a first protrusion 110 and a second protrusion 111. The first protrusion 110 and a second protrusion 111 have an accommodating groove 112 therebetween. The other end 11B of the rotating bracket 11 is protruded from the opening 100 and connected to the speaker component 3. The locking block 12 is disposed in the body 10 and is movable to close to or away from the accommodating groove 112. When the locking block 12 is engaged with the accommodating groove 112, the rotating bracket 11 is limited to rotate.

Specifically, when the locking block 12 is engaged with the accommodating groove 112, one end 11A of the rotating bracket 11 (the end adjacent to the locking block 12) is at a low point, and the other end 11B (the end connected to the speaker component 3) is at a high point. At this time, the rotating bracket 11 could not rotate, so that the speaker component 3 on the other end 11B is kept at a certain distance from the user's ear (or head). On the other hand, when the locking block 12 is not engaged with the accommodating groove 112, the rotating bracket 11 is driven by a component such as a spring. So that one end 11A of the rotating bracket 11 is at a high point, and the other end 11B is at a low point. As a result, the speaker component 3 on the other end 11B of the rotating bracket 11 is pressed against the user's ear (or head). With the above configuration, the user may adjust the distance between the speaker component 3 and the user self as required. It should be noted that the "high point" and "low point" mentioned above are observed from the transverse section of connecting component 1. "High point" may also be understood as a position away from the user's head, and "low point" may also be understood as a position close to the user's head. Hereinafter, various elements and operation thereof of the present disclosure will be further explained in order to make the present disclosure easier and clearer to understand.

As shown in FIG. 4 and FIG. 5, in some embodiments, the connecting component 1 further includes a first elastic member 13. One end of the first elastic member 13 abuts on the locking block 12, and the other end abuts on the body 10. For example, the first elastic member 13 may be a spring or an element with a similar or the same function, which is used to push the locking block 12 to move in the direction of the accommodating groove 112, and provides a compressed space when the locking block 12 is pushed by the rotating bracket 11

In some embodiments, the connecting component 1 further includes a rotating pin 14 and a second elastic member 15. The rotating pin 14 passes through the rotating bracket 11 and the second elastic member 15. For example, the second elastic member 15 may be a spring or an element with similar or the same function, which is used to drive the other end 11B of the rotating bracket 11 to move toward the low point (ie, toward the user). As a result, when the locking block 12 is not engaged with the accommodating groove 112, the rotating bracket 11 or the speaker component 3 is automatically pressed against the user's ear (or near).

As shown in FIG. 4, in some embodiments, the locking block 12 has a locking body 120 and a locking protrusion 121. The locking protrusion 121 protrudes from the locking body 120, and the locking protrusion 121 has an upper surface 121A, a lower surface 121B, and a side surface 121C between the upper surface 121A and the lower surface 121B. The upper surface 121A and the lower surface 121B are plane surfaces, and the side surface 121C is an arc surface. Specifically, the locking protrusion 121 is configured to engage with the accommodating groove 112. Therefore, the size and shape of the locking protrusion 121 correspond to the size and shape of the accommodating groove 112. Furthermore, the arc-shaped side surface 121C may also reduce the friction between the side surface 121C and the first protrusion 110 and the friction between the side surface 121C and the second protrusion 111. Therefore, the service life between the elements is improved. In addition, smooth operation feedback is provided to the user. In some embodiments, the upper surface 121A and the side surface 121C may have chamfers therebetween, and/or the lower surface 121B and the side surface 121C may have chamfers therebetween. Therefore, the friction is further reduced, and better operational feedback is provided.

As shown in FIG. 5, in some embodiments, the first protrusion 110 and the second protrusion 111 of the rotating bracket 11 have an angle θ therebetween, and the angle θ corresponds to the size of the locking protrusion 121. For example, when the size of the locking protrusion 121 is larger, the angle θ between the first protrusion 110 and the second protrusion 111 of the rotating bracket 11 is larger. With the larger locking protrusion 121, a more stable locking effect may be achieved. On the other hand, when the size of the locking protrusion 121 is smaller, the angle θ between the first protrusion 110 and the second protrusion 111 of the rotating bracket 11 is smaller. With the smaller locking protrusion 121, the volume of the components may be reduced. Therefore, the miniaturization effect of the device is realized.

As shown in FIG. 4, in some embodiments, the upper surface 121A of the locking block 12 has an engaging groove 122. The connecting component 1 further includes a locking pin 16. One end of the locking pin 16 is disposed on the body 10, and the other end is disposed in engaging groove 122. The locking pin 16 is used to limit the movement of the locking block 12. Specifically, the locking block 12 also has an engaging protrusion 123, and the engaging protrusion 123 is in the engaging groove 122. When the locking pin 16 is engaged with the engaging protrusion 123, the locking block 12 is limited from moving toward the accommodating groove 112. The detailed configuration will be described hereinafter.

In some embodiments, the engaging groove 122 has an engaging channel 124. The engaging channel 124 is formed by the cooperation of the engaging groove 122 and the engaging protrusion 123. The other end of the locking pin 16 moves along the engaging channel 124 and optionally limits the movement of the locking block 12 when the locking block 12 is approached and/or moved away from the rotating bracket 11. The detailed configuration will be described hereinafter.

FIG. 5, FIG. 7, FIG. 9, and FIG. 11 respectively are schematic diagrams of the operation of the rotating bracket and the locking block according to an embodiment of the present disclosure. FIG. 6, FIG. 8, FIG. 10, and FIG. 12 respectively are schematic diagrams of the operation of the locking pin and the locking block according to an embodiment of the present disclosure. Specifically, FIG. 5, FIG. 7, FIG. 9, and FIG. 11 are schematic diagrams of the relationship between the rotating bracket and the locking block viewed from the side. FIG. 6, FIG. 8, FIG. 10, and FIG. 12 are schematic diagrams of the relationship between the locking pin and the locking block viewed from the top.

Figure 6:
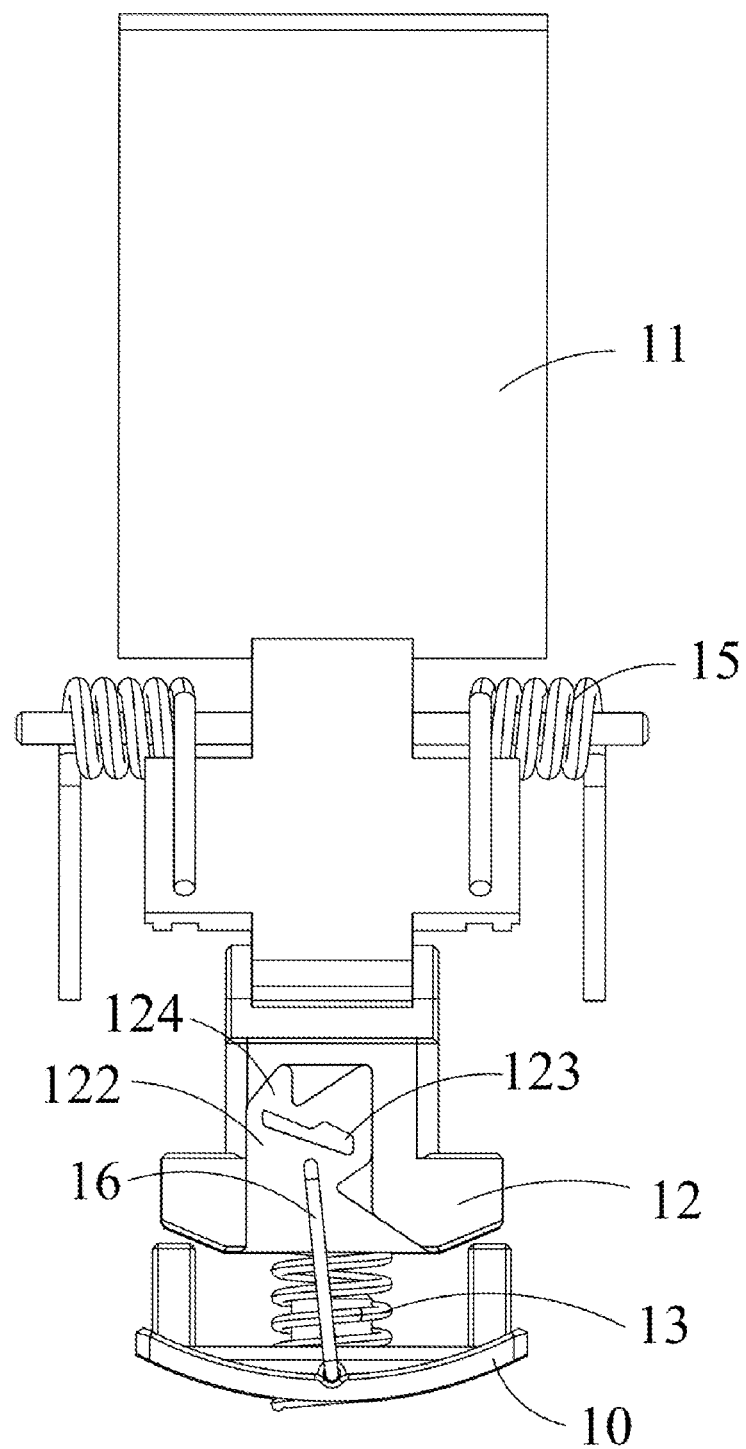
FIG. 6, FIG. 8, FIG. 10, and FIG. 12 respectively are schematic diagrams of an operation of the locking pin and the locking block according to an embodiment of the present disclosure.

As shown in FIG. 5 and FIG. 6, which are schematic diagrams of the state in which the speaker component 3 is fixed and kept at a certain distance from the user. Specifically, the locking block 12 in FIG. 5 and FIG. 6 is not limited by the locking pin 16 (that is, the locking pin 16 is not engaged with the engaging protrusion 123 on the locking block 12). Therefore, the locking block 12 is pushed out by the first elastic member 13 and engaged with the accommodating groove 112 of the rotating bracket 11. At the same time, one end 11A of the rotating bracket 11 is at a low point, and the other end 11B is at a high point. As a result, the rotating bracket 11 may not be rotated, so that the speaker component 3 on the other end 11B is kept at a certain distance from the user's ear (or head).

Figure 7:
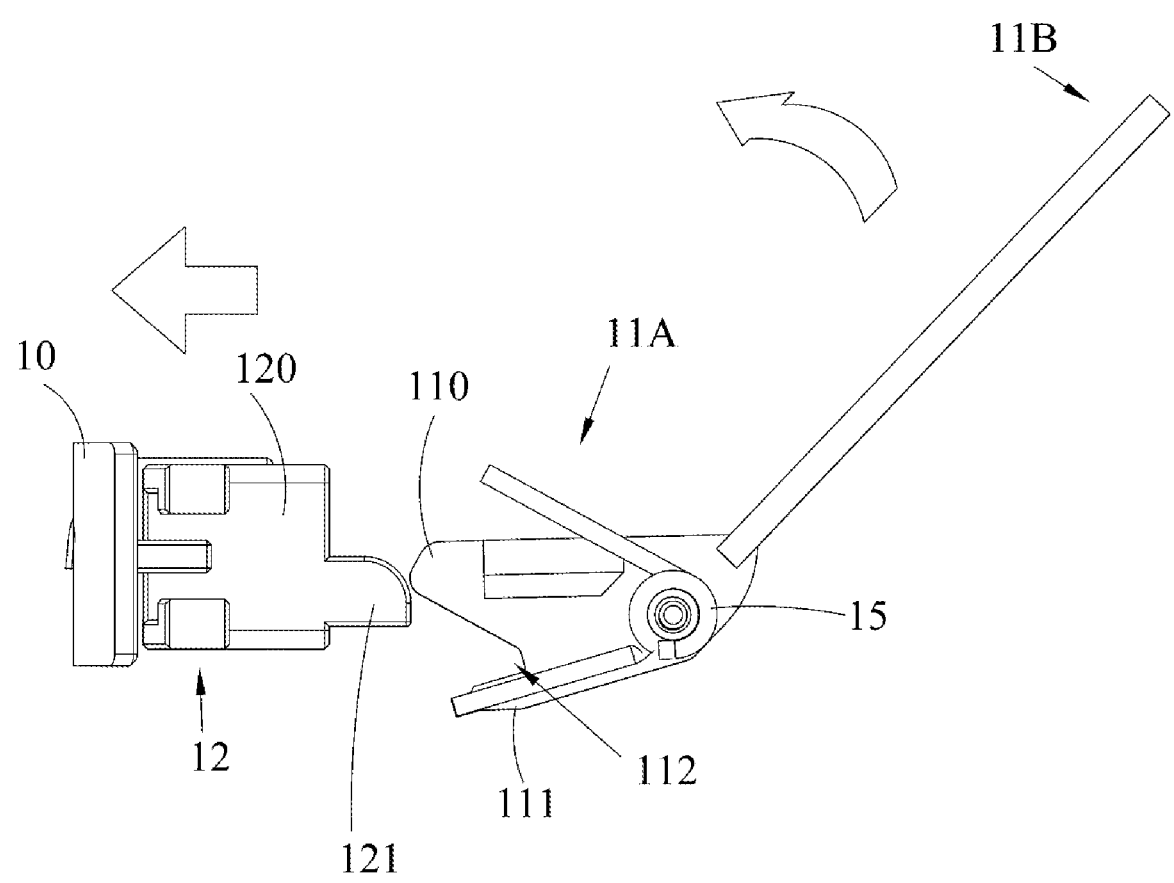
Figure 8:
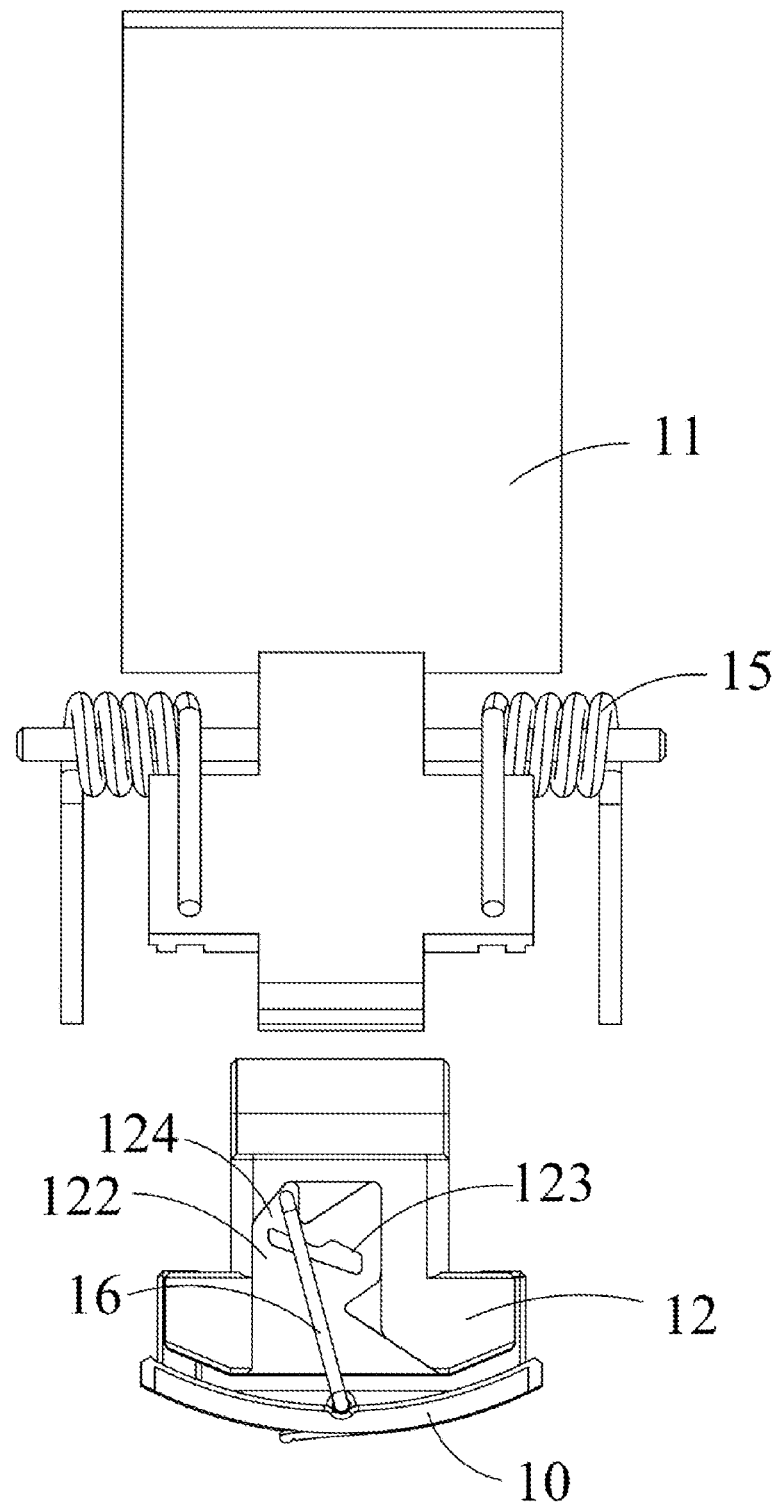

As shown in FIG. 7 and FIG. 8, when the user pushes the speaker component 3 away from the ear (or head), one end 11A of the rotating bracket 11 moves downward. Furthermore, the first protrusion 110 of the rotating bracket 11 presses against the locking block 12 and cause the locking block 12 to be pushed back. At the same time, the locking pin 16 moves along the path of the engaging channel 124. Specifically, the locking pin 16 moves from the left side of the engaging groove 122 to the upper left corner of the engaging groove 122.

Figure 9:
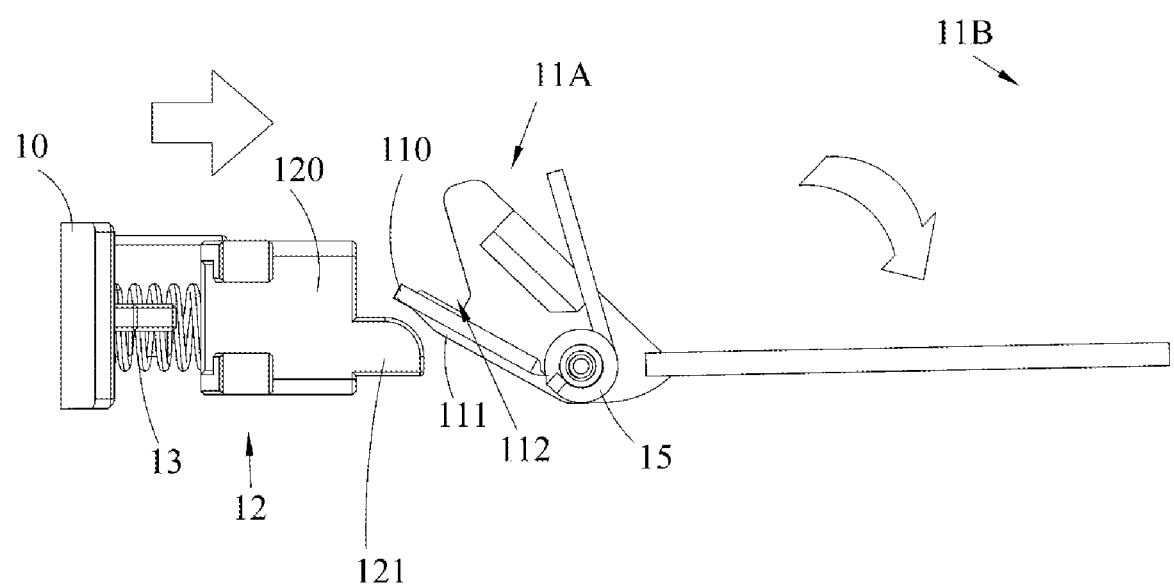
Figure 10:
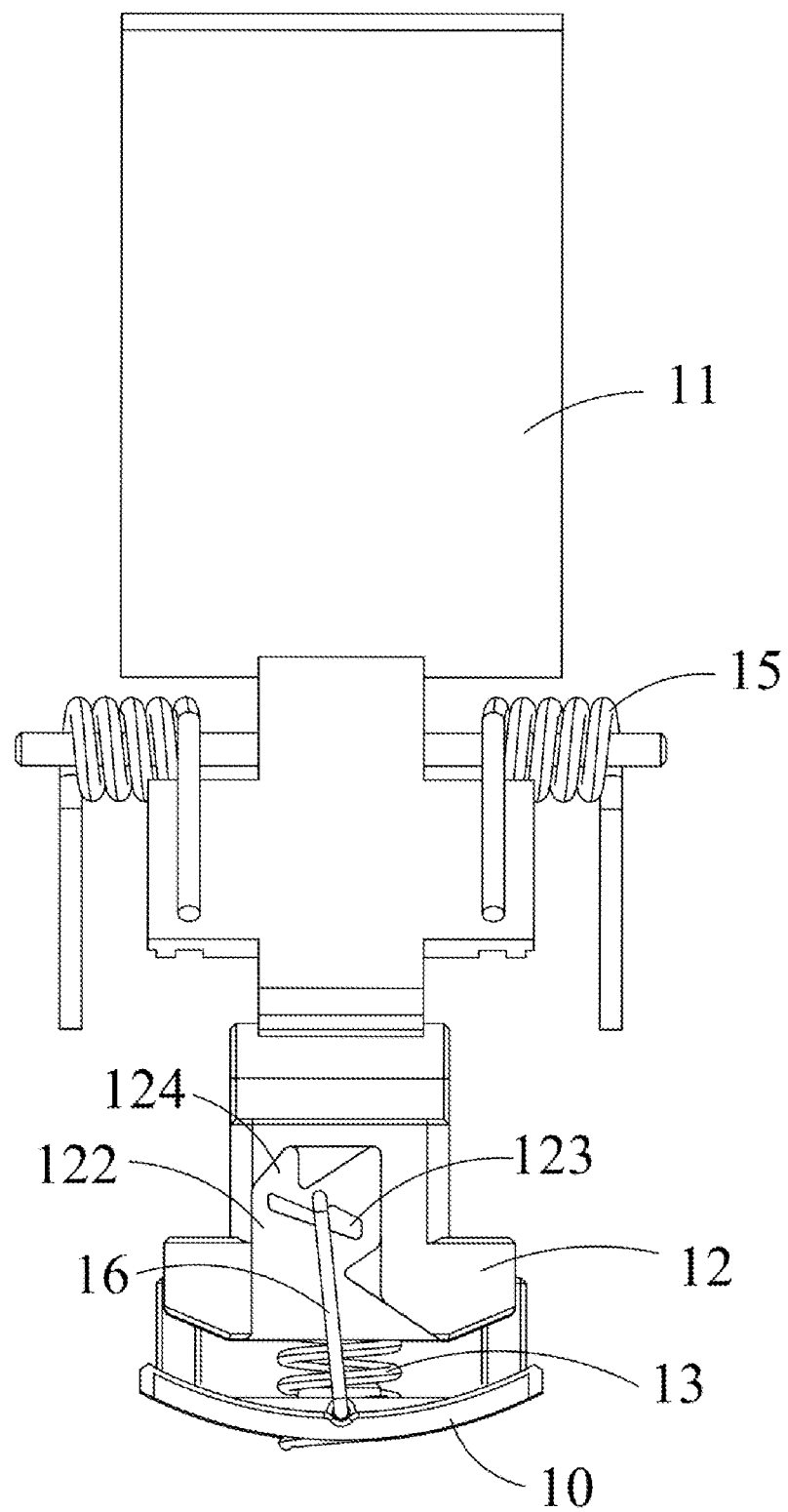

As shown in FIG. 9 and FIG. 10, when the user stops pushing the speaker component 3, the locking block 12 is pushed by the first elastic member 13 to move toward the accommodating groove 112. When the locking block 12 moves relative to the locking pin 16, the locking pin 16 is engaged with the groove of the engaging protrusion 123 in FIG. 10. Therefore, the locking block 12 is limited from continuing to move. When the locking block 12 stops moving, the rotating bracket 11 that is not engaged by the locking block 12 is driven by the second elastic member 15. In this case, one end 11A of the rotating bracket 11 is moved toward the high point, and the other end 11B of the rotating bracket 11 is moved toward the low point. In other words, the speaker component 3 on the other end 11B is close to or pressed against the user's ear (or head).

Figure 11:
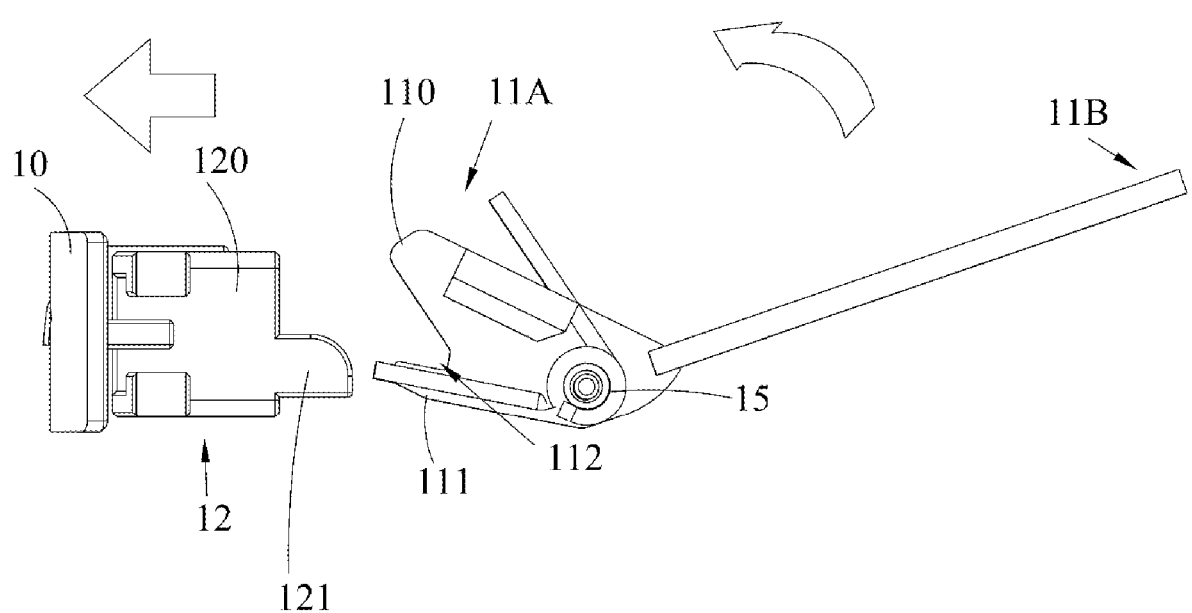
Figure 12:
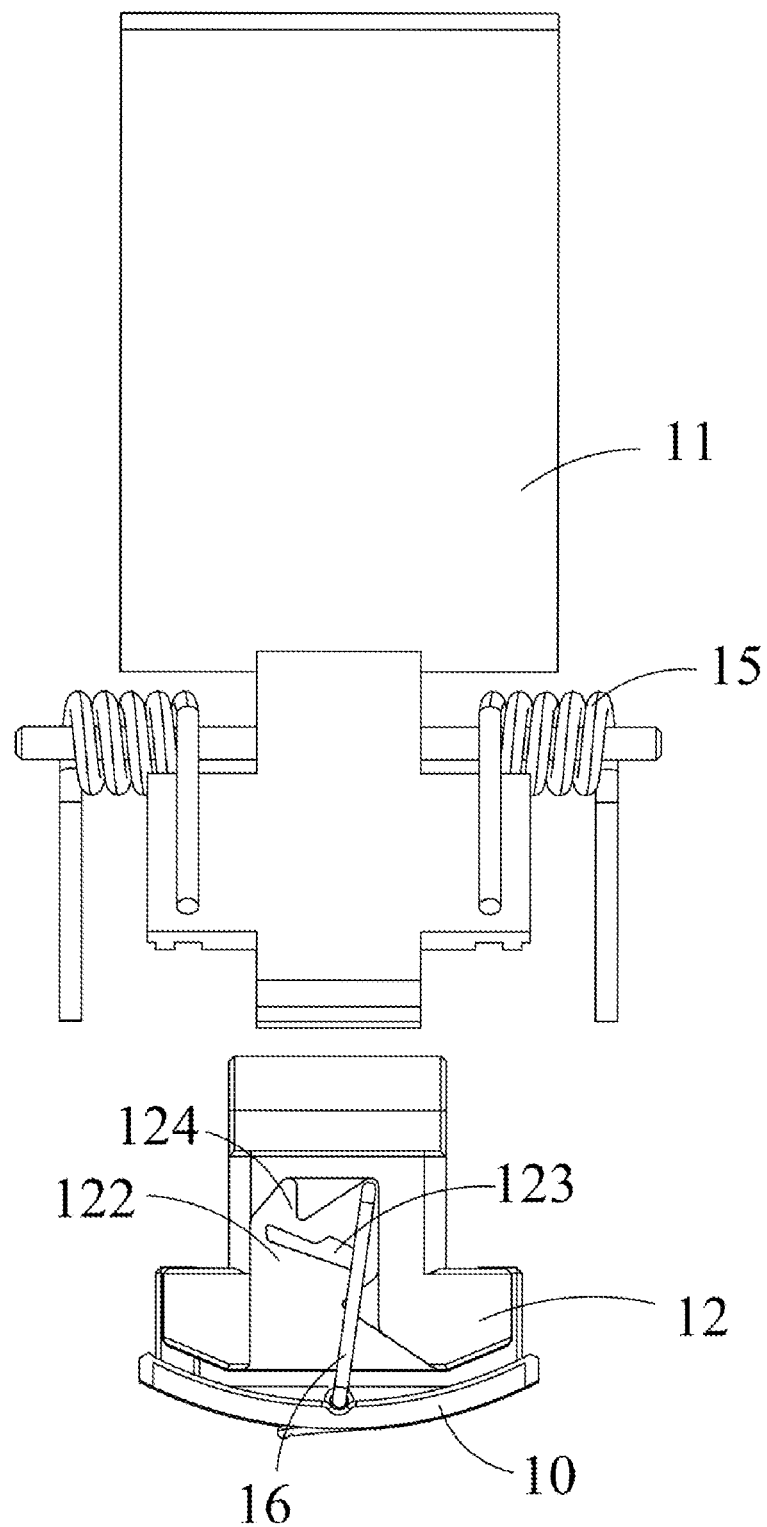

As shown in FIG. 11 and FIG. 12, when the user pushes the speaker component 3 away from the ear (or head) again, one end 11A of the rotating bracket 11 moves downward. Furthermore, the second protrusion 111 of the rotating bracket 11 presses against the locking block 12 and cause the locking block 12 to be pushed back. At the same time, the locking pin 16 moves along the path of the engaging channel 124. Specifically, the locking pin 16 moves from the center of the engaging groove 122 to the upper right corner of the engaging groove 122. Finally, when the user stops pushing the speaker component 3, the locking block 12 is pushed by the first elastic member 13 to move toward the accommodating groove 112 and engages in the accommodating groove 112 again. At the same time, the locking pin 16 also moves from the upper right corner of the engaging groove 122 to the bottom of the engaging groove 122. That is, the head-mounted device returns to the initial state (as shown in FIG. 5 and FIG. 6).

As mentioned above, according to the configuration of each element in the present disclosure, the user may switch the distance between the speaker component 3 and the ear (or head) by pushing or pulling the speaker component 3 toward a direction away from the ear (or head), so as to prevent the discomfort from wearing the speaker component 3 for a long time. In addition, the simple and intuitive switching method also helps to improve the user experience.

As shown in FIG. 3, in some embodiments, the body 10 includes a first base 100, a second base 101, a first cover 102, a second cover 103, and an outer shell 104.

The first base 100 is disposed on the display component 2 and has an accommodation space. In some embodiments, the first base 100 may be a plastic part to avoid problems such as leakage between the display component 2 and the connecting component 1. In addition, the first base 100 may be disposed on both sides of the display component 2 by any method well known to a person having ordinary skill in the art, such as locking, bonding, engaging, etc., but the present disclosure is not limited thereto.

The second base 101 is disposed in the accommodation space. In some embodiments, the second base 101 may be a high-strength metal piece to more securely carry components located thereon. In addition, the second base 101 may be disposed in the first base 100 by any method well known to a person having ordinary skill in the art, such as locking, bonding, engaging, etc., but the present disclosure is not limited thereto.

The second cover 103 is disposed on the second base 101. The first cover 102 is disposed on one side of the second base 101, and one side of the first cover 102 is connected to the locking block 12. For example, the second cover 103 and the first cover 102 may be disposed on the second base 101 by any method well known to a person having ordinary skill in the art, such as locking, bonding, engaging, etc., but the present disclosure is not limited thereto. Wherein, the first elastic member 13 is disposed between the first cover 102 and the locking block 12. In addition, the locking block 12 and a part of the rotating bracket 11 are disposed between the second cover 103, the first cover 102, and the second base 101.

The case 104 is disposed on the first base 100 and is configured to protect the components located therein from external moisture, dirt, or dust. For example, the case 104 may be disposed on the first base 100 by any method well known to a person having ordinary skill in the art, such as locking, bonding, engaging, etc., but the present disclosure is not limited thereto.

In some embodiments, the body 10 further includes a plurality of buffers and an adhesive 106. A part of the plurality of buffer (buffer 105A) is disposed between the first base 100 and the second base 101, and a part of the plurality of buffer (buffer 105B) is disposed between the second base 101 and the second cover 103. For example, the buffer 105A and/or the buffer 105B may be damping silicone, Teflon, or other components with higher damping coefficients to reduce the resonance between the various components. The adhesive 106 is disposed between the second cover 103 and the casing 104. For example, the adhesive 106 may include Epoxy acrylate, Urethane acrylate, Polyether acrylate, Polyester acrylate, Acrylic resin, or any combination thereof, but the present disclosure is not limited thereto.

In summary, head-mounted device of the present disclosure may make the speaker component connected to the rotating bracket have two fixed states through the cooperation between the locking block component and the rotating bracket in the connecting. Specifically, one of the states is that the speaker component is pressed against the user's head, and the other state is that the speaker component is not in contact with the user's head. As a result, the user may adjust the speaker component according to the needs, thereby avoiding the problem of discomfort caused by wearing it for a long time.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A head-mounted device, comprising:
a display component;
a speaker component, and
a connecting component, wherein two ends of the connecting component are respectively connected to the display component and the speaker component, and the connecting component comprises:
a body connected to the display component, wherein the body has an opening;
a rotating bracket disposed in the body, wherein one end of the rotating bracket has a first protrusion portion and a second protrusion portion, the first protrusion portion and the second protrusion portion have an accommodating groove therebetween, the other end of the rotating bracket passes through the opening and is connected to the speaker component; and
a locking block disposed in the body, wherein the locking block is movable to close to or away from the accommodating groove; when the locking block is engaged with the accommodating groove, the rotating bracket is limited to rotate;
wherein a surface of the locking block has an engaging groove, the connecting component further comprises a locking pin, one end of the locking pin is disposed on the body, and the other end of the locking pin is in the engaging groove,
wherein the locking block further has an engaging protrusion, the engaging protrusion is in the engaging groove; when the locking pin is engaged with the engaging protrusion, the locking block is limited from moving towards the accommodating groove.

2. The head-mounted device of claim 1, wherein the connecting component further comprises a first elastic member, one end of the first elastic member abuts on the locking block, and the other end of the first elastic member abuts on the body.

3. The head-mounted device of claim 1, wherein the engaging groove has an engaging channel; when the locking block approaches and/or moves away from the accommodating groove, the other end of the locking pin moves along the engaging channel.

4. The head-mounted device of claim 1, wherein the connecting component further comprises a rotating pin and a second elastic member, and the rotating pin passes through the rotating bracket and the second elastic member.

5. The head-mounted device of claim 1, wherein the locking block has a locking body and a locking protrusion, the locking protrusion protrudes from the locking body, the locking protrusion has an upper surface, a lower surface, and a side surface between the upper surface and the lower surface, the upper surface and the lower surface are plane surfaces, and the side surface is an arc surface.

6. The head-mounted device of claim 5, wherein the first protrusion and the second protrusion of the rotating bracket have an angle therebetween, and the angle corresponds to the size of the locking protrusion.

7. The head-mounted device of claim 1, wherein the body comprises:
- a first base disposed on the display component, wherein the first base has an accommodation space; and
- a first cover disposed in the accommodation space, wherein one side of the first cover is connected to the locking block.

8. The head-mounted device of claim 7, wherein the body further comprises a second base disposed in the accommodation space and a second cover disposed on the second base, the first cover is disposed on one side of the second base, the second cover, the first cover, and the second base cover the locking block and part of the rotating bracket.

* * * * *